(12) United States Patent
Yamashiro et al.

(10) Patent No.: US 10,536,821 B2
(45) Date of Patent: Jan. 14, 2020

(54) COMMUNICATION DEVICE

(71) Applicant: DENSO CORPORATION, Kariya, Aichi-pref. (JP)

(72) Inventors: Takahisa Yamashiro, Kariya (JP); Seigou Kumabe, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 15/744,241

(22) PCT Filed: Jul. 14, 2016

(86) PCT No.: PCT/JP2016/070764
§ 371 (c)(1),
(2) Date: Jan. 12, 2018

(87) PCT Pub. No.: WO2017/047217
PCT Pub. Date: Mar. 23, 2017

(65) Prior Publication Data
US 2018/0270633 A1  Sep. 20, 2018

(30) Foreign Application Priority Data

Sep. 17, 2015  (JP) .................. 2015-184276

(51) Int. Cl.
H04W 4/20 (2018.01)
H04W 4/40 (2018.01)
(Continued)

(52) U.S. Cl.
CPC .............. *H04W 4/20* (2013.01); *H04W 4/40* (2018.02)

(58) Field of Classification Search
CPC .... G08G 1/161; G08G 5/0013; G08G 5/0069; G08G 5/04; H04B 7/24–26;
(Continued)

(56) References Cited

U.S. PATENT DOCUMENTS 8,761,676 B2  6/2014 Hu et al.
8,942,253 B2  1/2015 Juan et al.
(Continued)

FOREIGN PATENT DOCUMENTS

JP  2009239745 A  10/2009
JP  2011120231 A  6/2011
JP  2011120232 A  6/2011

*Primary Examiner* — Yuwen Pan
*Assistant Examiner* — Paul P Tran
(74) *Attorney, Agent, or Firm* — Harness, Dickey & Pierce, P.L.C.

(57) ABSTRACT

A communication device is used in a mobile communication system switching alternately two communication time zones of a control channel (CCH) time zone in which communication using a control channel (CCH) is performed and a service channel time zone in which communication using a service channel is performed. A CCH transmission processor section transmits data using the control channel. When a generated data by a data generator section is determined by an importance determiner section to be equivalent to a data having a high-importance level, the generated data is transmitted in the CCH time zone by the CCH transmission processor section. By contrast, when the generated data is determined to be equivalent to a data having a low-importance level, the generated data is transmitted in the SCH time zone by the CCH transmission processor section.

7 Claims, 8 Drawing Sheets

(51) Int. Cl.
*H04M 11/00* (2006.01)
*H04W 4/50* (2018.01)
*H04W 4/44* (2018.01)
*H04W 84/00* (2009.01)

(58) Field of Classification Search
CPC ......... H04H 60/80; H04H 20/71; H04W 4/04; H04W 4/48; H04W 4/80; H04W 28/10; H04W 36/06; H04W 48/12; H04W 72/00; H04W 72/04; H04W 72/0406; H04W 72/0453; H04W 72/10; H04W 74/0816; H04W 4/008; H04W 4/20; H04W 4/22; H04W 4/44; H04W 4/50; H04W 4/90; H04W 24/00; H04W 28/14; H04W 48/18; H04W 72/06; H04W 74/002; H04W 76/50; H04W 84/005; H04W 4/40; H04M 11/00; G05D 1/0022; H04L 47/10; H04L 47/11; H04L 47/14; H04L 47/2433; H04L 47/29; H04L 47/30; H04L 67/12
USPC ....................................................... 455/41.2
See application file for complete search history.

(56) References Cited

U.S. PATENT DOCUMENTS

| | | | |
|---|---|---|---|
| 2010/0111226 A1* | 5/2010 | Ko ....................... | H04B 7/0639 375/299 |
| 2010/0214996 A1* | 8/2010 | Santhanam ........... | H04W 76/36 370/329 |
| 2011/0128849 A1* | 6/2011 | Guo ...................... | H04W 28/10 370/235 |
| 2011/0128902 A1 | 6/2011 | Guo | |
| 2011/0294434 A1* | 12/2011 | Hu ........................ | H04W 72/00 455/62 |
| 2011/0306353 A1* | 12/2011 | Kim ...................... | H04W 48/18 455/452.2 |
| 2012/0188964 A1* | 7/2012 | Zhang ................ | H04W 72/0406 370/329 |
| 2015/0305038 A1* | 10/2015 | Du ........................ | H04W 48/12 370/329 |
| 2016/0371987 A1* | 12/2016 | Kotecha ................ | G08G 5/0013 |
| 2017/0251486 A1* | 8/2017 | Hu ..................... | H04W 72/1242 |

* cited by examiner

COMMUNICATION DEVICE

CROSS REFERENCE TO RELATED APPLICATIONS

This application is a U.S. National Phase Application under 35 U.S.C. 371 of International Application No. PCT/JP2016/070764 filed on Jul. 14, 2016 and published in Japanese as WO 2017/047217 A1 on Mar. 23, 2017. This application is based on and claims the benefit or priority from Japanese Patent Application No. 2015-184276 filed on Sep. 17, 2015. The entire disclosures of all of the above applications are incorporated herein by reference.

TECHNICAL FIELD

The present disclosure relates to a communication device in a mobile communication system including a service provision device that performs wireless communication with in-mobile devices respectively used in a plurality of mobile objects to thereby provide a predetermined service to users in the mobile objects.

BACKGROUND ART

There is known WAVE (Wireless Access in Vehicular Environments) as a telecommunications standard for a communication device managed by a service provider (hereinafter, service provision device) and communication devices used in mobile objects such as vehicles (hereinafter, in-mobile devices) to execute direct wireless communications with each other, e.g., in Patent literature 1.

The above service provider signifies an entity such as company, shop, public institution, which provides a predetermined service to users using the in-mobile devices. For convenience, hereinafter, the system in which the service provision device and the in-mobile devices communicate with each other in compliance with the WAVE standard is referred to as a mobile communication system.

WAVE specifies two kinds of communication channels of a control channel (CCH, hereinafter) and a service channel (SCH, hereinafter); two kinds of communication channels are used for communication devices to perform communications. An SCH is a communication channel used to transmit and receive the information for providing and using services. A CCH is a communication channel used to distribute the message (hereinafter, WSA: Wave Service Advertisement) for the service provision device to start the communication with the in-mobile devices using the SCH. The in-vehicle device can recognize a currently available service by receiving the WSA transmitted from the service provision device via the control channel.

Further, WAVE designates alternately a CCH time zone in which the communication using the CCH should be performed and an SCH time zone in which the communication using the SCH may be allowed, with predetermined time intervals (each 50 milliseconds, for instance). The in-mobile device switches a communication channel as a target for transmission and reception (hereinafter, communication-target channel) depending on the transitions of the time zones, thereby performing the communication via the control channel or the communication via the service channel.

For example, the in-mobile device designates the CCH as a communication channel when not needing to perform the communication using an SCH. By contrast, when needing to perform the communication via an SCH, the communication-target channel is switched from the CCH into the SCH at the switching point of time at which the CCH time zone transitions into the SCH time zone, thereby performing the communication using the SCH. Then, at the point of time at which the SCH time zone is completed, the communication-target channel is returned from the SCH to the CCH. Note that the case where the in-mobile device needs to perform the communication using the SCH includes the case where after receiving a WSA transmitted using the CCH from a service provision device, the in-mobile device uses the service indicated in the WSA.

PRIOR ART LITERATURES

Patent Literature

Patent literature 1: U.S. Pat. No. 8,942,253 B2

SUMMARY OF INVENTION

A service provision device has a communication area that is specified as needed by an administrator of the service provision device. Furthermore, the communication area of a service provision device is equivalent to the area where an in-mobile device can receive a signal transmitted by the service provision device.

In addition, a service provision device is installed with an intended communication area at an intended position by a service provider; this may form an area (hereinafter, overlap area) where the communication areas of a plurality of service provision devices overlap with each other. At such an overlap area, the WSA(s) transmitted from the respective service provision devices arrive. In other words, in the overlap area, the control channel is shared by the plurality of service provision devices.

In addition, as the number of the service provision devices each having a communication area including an identical position increases, the number of the service provision devices using the control channel at the identical position increases. As the number of the service provision devices using the control channel increases, the control channel as a communication resource is crowded more; this increases a possibility of the packet collision.

Incidentally, a plurality of service provision devices forming an overlap area may include not only a device that provides an importance service to an in-mobile device but also a device that provides a relatively low-importance service to an in-mobile device. Such an overlap area may thus pose a possibility that a WSA transmitted by a service provision device providing a relatively low-importance service collides with another WSA transmitted by another service provision device providing a high-importance service. The WSA colliding with the other WSA cannot naturally be received by the in-mobile device normally.

That is, in the overlap area, an in-mobile device may not receive a WSA of a high-importance service due to a WSA of a relatively low-importance service.

The above exemplifies an issue in an overlap area as a possibility that a WSA of a relatively low-importance service prevents an in-mobile device from receiving a WSA of a high-importance service. However, the data having a high importance for an in-mobile device is not limited to a WSA of a service having a high importance. Another configuration may be also assumed in which a service provision device uses the control channel in order to transmit a high-importance data, which needs to be received by an in-mobile device but belongs to a data kind different from a WSA.

In addition, the cause of an in-mobile device failing to receive a high-importance data is not limited to a WSA of a low-importance service. Any data transmitted using the control channel may serve as a collision partner of the high-importance data.

It is an object of the present disclosure to provide a communication device that can reduce a possibility of an in-mobile device failing to receive a high-importance data among data transmitted using a control channel.

In order to achieve the above object, according to an aspect of the present disclosure, a communication device used in a mobile communication system is provided to include a time holder section, a time zone determiner section, a CCH transmission processor section, a data generator section, and an importance determiner section. The mobile communication system switches alternately two communication time zones of a control channel (CCH) time zone and a service channel (SCH) time zone. The CCH time zone is a time zone in which communication using a control channel assigned with a predetermined radio-wave frequency is performed. The SCH time zone is a time zone different from the CCH, the SCH time zone in which communication using a service channel is performed. The time holder section holds clock time information used to determine a communication time zone at present. The time zone determiner section determines whether the communication time zone at present corresponds to the CCH time zone or the SCH time zone, based on the clock time information held by the time holder section. The CCH transmission processor section transmits data using the control channel. The data generator section generates data that is to be transmitted using the control channel. The importance determiner section determines whether the data generated by the data generator section corresponds to a data having a high-importance level or a data having a low-importance level based on a kind of data. Herein, when the data generated by the data generator section is determined to correspond to the data assigned with the high-importance level, the CCH transmission processor section transmits the data assigned having the high-importance level in the CCH time zone. In contrast, when the data generated by the data generator section is determined to correspond to the data having the low-importance level, the CCH transmission processor section transmits the data having the low-importance level in the SCH time zone.

Under the above configuration, the importance determiner section determines whether the data generated by the data generator section corresponds to a data having a high-importance level or a data having a low-importance level. When the data generated by the data generator section is determined to correspond to a data having a high-importance level, the CCH transmission processor section transmits the data having the high-importance level in the CCH time zone. In contrast, when the data generated by the data generator section is determined to correspond to a data having the low-importance level, the CCH transmission processor section transmits the data having the low-importance level in the SCH time zone.

Therefore, a data having a low-importance level for an in-mobile device is allowed to be transmitted during the SCH time zone by previously assigning a low-importance level to the data having the low-importance level. Such a configuration can reduce, in the CCH time zone, a congestion of the control channel as a communication resource. This reduces a possibility of an in-mobile device failing to receive a data having a high-importance level for the in-mobile device.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiment

Figure 1:
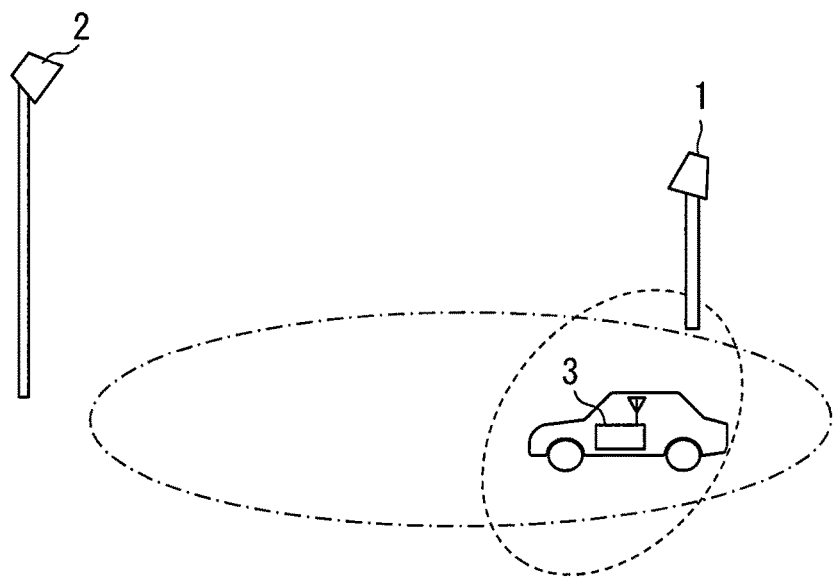
FIG. 1 is a diagram illustrating an example of a schematic configuration of a mobile communication system according to the present embodiment.

The following explains an embodiment of the present disclosure with reference to drawings. FIG. 1 is a block diagram illustrating an example of a schematic configuration of a mobile communication system 100 according to the present embodiment. As in FIG. 1, the mobile communication system 100 includes a short-range service provision device 1, a wide-range service provision device 2, and an in-vehicle device 3.

<Schematic Configuration of Mobile Communication System 100>

The short-range service provision device 1, the wide-range service provision device 2, and the in-vehicle device 3 each are configured to perform wireless communications in compliance with a standard of WAVE (Wireless Access in Vehicular Environment). A wireless communication in compliance with the standard of WAVE will be referred to as WAVE communication, for convenience.

Both the short-range service provision device 1 and the wide-range service provision device 2 perform the WAVE communication with the in-vehicle device 3, thereby providing a predetermined service to a user of the in-vehicle device 3. The following will use a service provision device when not distinguishing the short-range service provision device 1 and the wide-range service provision device 2 from each other. In addition, a communication device will be used when not distinguishing, from each other, the service provision device providing a service and the in-vehicle device 3 using the service.

The service provision device is managed by a predetermined service provider. The above service provider signifies an entity such as company, shop, public institution, which provides a predetermined service to users using the in-vehicle device 3.

The difference between the short-range service provision device 1 and the wide-range service provision device 2 is in the magnitude of the area (hereinafter, service provision area) for a target of service provision. The short-range service provision device 1 is a service provision device that provides a relatively narrow service provision area; the wide-range service provision device 2 is a service provision device that provides a relatively broad service provision area. The correspondence relation between the contents of services and the provision areas of the services will be explained later. The short-range service provision device 1 and the wide-range service provision device 2 are each equivalent to a communication device.

In FIG. 1, the area surrounded by broken lines illustrates a service provision area of the short-range service provision device 1; the area surrounded by alternate long and short dash line lines illustrates a service provision area of the wide-range service provision device 2. FIG. 1 illustrates, but not limited to, a single short-range service provision device 1 and a single wide-range service provision device 2; the mobile communication system 100 may include a plurality of short-range service provision devices 1 and/or a plurality of wide-range service provision devices 2 as a whole.

The in-vehicle device 3 is used in a vehicle. The in-vehicle device 3 is device/apparatus via which a user of the vehicle uses the service provided from the various service provision devices mentioned above. The in-vehicle device 3 is equivalent to an in-mobile device that is a device in a mobile object.

<Relating to WAVE>

WAVE assigns communication channels to one control channel and a plurality of service channels (e.g., six service channels). The control channel and the service channels are achieved by being assigned with mutually different radio-wave frequencies. Note that the control channel and the service channels may be achieved with the frequencies belonging to 5.8 GHz band, 5.9 GHz band, and/or 2.4 GHz band. Frequencies belonging to other frequency bands may be also employed.

The service channel is a communication channel used in order that each communication device transmits and receives the information for providing and using services. In addition, the service channel may be also a communication channel used in order that the in-vehicle device 3 performs well-known vehicle-to-vehicle communications with a different in-vehicle device 3. The service channels are assigned with respective unique numbers (hereinafter, channel number); the service channels may be distinguished from each other using the respective channel numbers. Note that "information," which may be used not only as an uncountable noun but also a countable noun, is equivalent to an information item. One information is equivalent to one information item; a plurality of informations are equivalent to a plurality of information items.

The control channel is a communication channel used, e.g., for a service provision device to distribute a WSA (Wave Service Advertisement) that is a message for starting the communication using a predetermined service channel with an in-vehicle device 3. A WSA includes the service kind information that indicates the kind of a service provided by the short-range service provision device 1, and the channel information that identifies a service channel used to provide the service from among a plurality of service channels. A WSA is equivalent to a service advertisement message.

Figure 2:
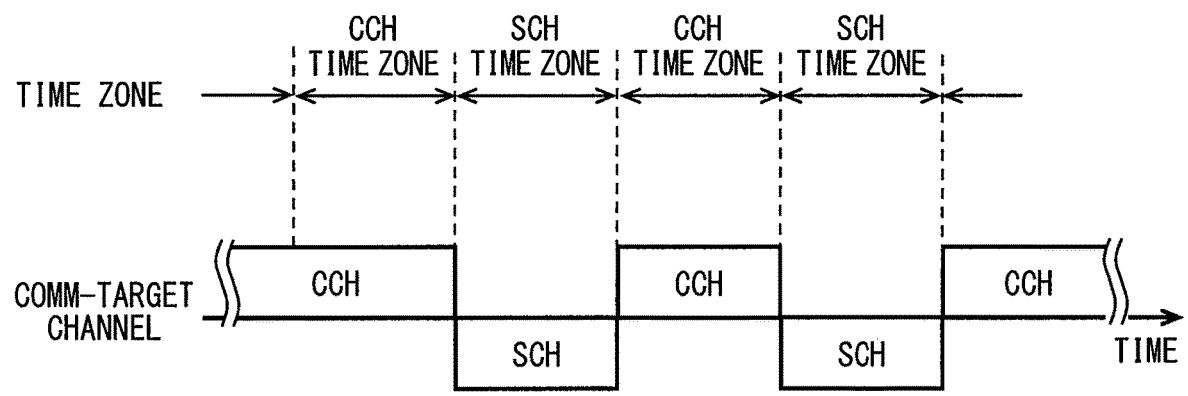
FIG. 2 is a diagram for explaining communication time zones.

Further, as in FIG. 2, WAVE designates alternately a CCH time zone for communication using the control channel and an SCH time zone for communication using the service channel, with predetermined time intervals. In the present embodiment, as one example, the CCH time zone and the SCH time zone are switched alternately each 50 milliseconds.

Note that CCH represents Control CHannel; SCH represents Service CHannel. A communication time zone may be also used when the CCH time zone and the SCH time zone need not to be distinguished from each other.

The in-vehicle device 3 is typically configured to be unpermitted to use a plurality of communication channels at the same time. In the present embodiment, as one example, the in-vehicle device 3 is supposed to be configured to be unpermitted to use a plurality of communication channels at the same time. The in-vehicle device 3 switches communication channels as a target for transmission and reception (hereinafter, communication-target channel) in order among a plurality of communication channels specified by the WAVE, thereby performing the communication via the control channel or the service channel.

In addition, in the present embodiment, as an example, the short-range service provision device 1 is also configured to be unpermitted to use a plurality of communication channels at the same time, like the in-vehicle device 3. By contrast, the wide-range service provision device 2 is configured to be permitted to use two communication channels at the same time. However, all the wide-range service provision devices 2 included in the mobile communication system 100 need not be permitted to use a plurality of communication channels at the same time. There may be present a wide-range service provision device 2 that is configured to be permitted to designate only one communication channel as a communication-target channel. Such modification examples will be separately mentioned later.

In the WAVE, the in-vehicle device 3 designates the control channel as a communication-target channel during a period of time for which the current clock time is determined to be within the CCH time zone. That is, the communication using the control channel is performed while determining that the current clock time is within the CCH time zone.

Further, when needing to perform the communication using a predetermined service channel, the in-vehicle device 3 designates, as the communication-target channel, a corresponding service channel by switching from the control channel at the point of time when the CCH time zone transitions into the SCH time zone. Then, at the point of time at which the SCH time zone is completed, the communication-target channel is returned from the service channel to the control channel.

Note that the case of the in-vehicle device 3 needing to perform the communication using a predetermined service channel includes the case of the in-vehicle device 3 using a service provided by the service provision device, or the case of the in-vehicle device 3 performing the vehicle-to-vehicle communication with a different in-vehicle device 3 present in the vicinity. Further, when not needing to perform the communication using any service channel, the in-vehicle device 3 may continue designating the control channel as the communication-target channel even in the SCH time zone.

<Outline of Service Provision Device>

The following explains an outline of a short-range service provision device 1 and a wide-range service provision device 2, i.e., an outline of a service provision device. The service provision device provides a predetermined service by performing the WAVE communication with an in-vehicle device 3.

The services provided by a service provision device include an automatic fee collection service during running a toll road, an automatic parking fee collection service at parking, a traffic information distribution service, a position information report service, and an advertisement distribution service, for instance.

It is noted that an automatic fee collection service during running a toll road is a service that performs an automatic fee settlement of the fee of a toll road using the credit-card information or the account number of the banking service, which are registered previously. The fee of a toll road may be determined depending on the road segment or the time zone, which is used. In addition, an automatic parking fee collection service is a service that performs an automatic fee settlement of the fee of a parking lot.

A traffic information distribution service is a service that distributes the real time traffic information; a position information report service is a service that reports a detailed current position of the in-vehicle device 3 that is communicating with a corresponding service provision terminal. An advertisement distribution service is a service that distributes the information on goods requested to be advertised from a third party, and/or the goods that a service provider sells. The targets advertised by the advertisement distribution service may be not only goods but also services, enterprises, companies, or events.

The service provision device may be a movable type or a fixed type that is fixed to a position on roadside along a road. This movable type signifies a type that is movable to change positions for providing a service, but is fixed to a position at the time of providing a service (i.e., at the operating time).

In addition, the service provision device may be mounted in a mobile object such as a vehicle. A vehicle using the service provision device is different from a vehicle using the in-vehicle device 3. The service provision device mounted in a mobile object is referred to as a mobile service provision device; a mobile object using the mobile service provision device is referred to as a provision-use mobile object, for convenience.

The area (hereinafter, communication area) where the service provision device can perform the WAVE communication may be specified depending on a service provided by the service provision device. This is because the communication area of the service provision device is equivalent to a service provision area.

For example, when the service provision device provides a service that requires the two-way communications with the in-vehicle device 3, the communication area of the service provision device may be preferably a short range that is a relatively limited area. The services requiring the two-way communications by the service provision device and the in-vehicle device 3 include an automatic fee collection service during running a toll road, and an automatic parking fee collection service at parking. In addition, a position information report service may be desirable to be provided under a relatively limited narrow communication area of the service provision device.

By contrast, a traffic information distribution service or an advertisement distribution service (hereinafter, distribution service), which is fulfilled via the one-way communication from the service provision device to the in-vehicle device 3, may not need to be provided under a relatively limited narrow communication area. The communication area may be formed according to the contents of the information to distribute. For example, the distribution service may have the service provision area up to about 1 km from the service provision device. Naturally, even the distribution service may be provided under a narrow communication area within about tens of meters in radius.

The magnitude of the communication area of the service provision device corresponds to the maximum value (hereinafter, the maximum arrival distance) of the distance within which the radio wave transmitted by the service provision device is maintained with a signal strength being able to be demodulated (e.g., −85 dBm). In addition, the maximum arrival distance is depending on the output power of the transmitted radio wave; thus, the communication area is also depending on the output power of the transmitted radio wave.

The short-range service provision device 1 according to the present embodiment is a service provision device of which the maximum arrival distance of the radio wave is specified as being smaller than a predetermined area classification threshold value. By contrast, the wide-range service provision device 2 is a service provision device of which the maximum arrival distance is specified as being equal to or greater than the area classification threshold value.

This area classification threshold value, which classifies service provision devices into the short-range service provision device 1 and the wide-range service provision device 2 according to the magnitude of the communication area, may be designed as needed. For example, the area classification threshold value may be a value of hundreds of meters to 500 meters. In the present embodiment, the area classification threshold value is specified to be 400 meters, as an example. Further, the area classification threshold value may be specified to be tens of meters such as 20 meters.

The communication area having the maximum arrival distance less than the area classification threshold value is referred to as a short range; the communication area having the maximum arrival distance equal to or greater than the area classification threshold value is referred to as a wide range, for convenience. In addition, the service provided under the maximum arrival distance less than the area classification threshold value is referred to as a short-range service; the service provided under the maximum arrival distance equal to or greater than the area classification threshold value is referred to as a wide-range service.

<Configuration of Short-Range Service Provision Device 1>

The following explains a configuration of the short-range service provision device 1. The short-range service provision device 1 is a service provision device providing the communication area specified to be a short range, as mentioned above. In the present embodiment, this short-range service provision device 1 is a fixed-type service provision device, as an example.

Figure 3:
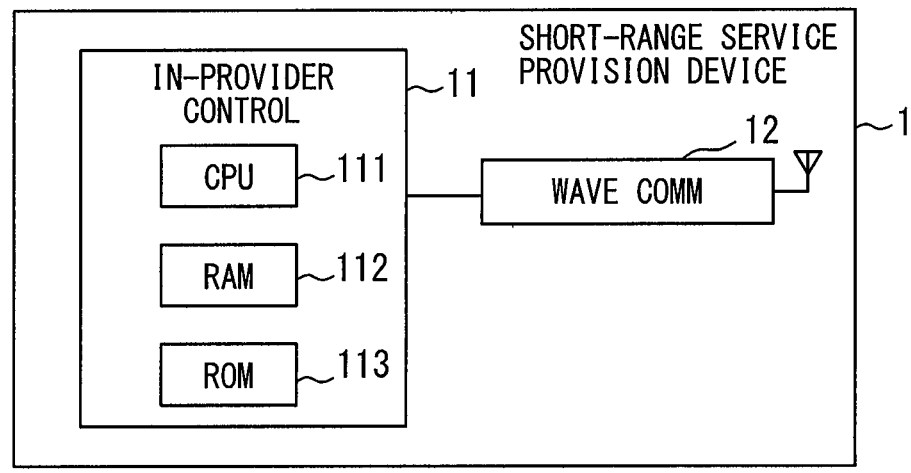
FIG. 3 is a block diagram illustrating an example of a schematic configuration of a short-range service provision device.

This short-range service provision device 1 includes an in-provider control circuit 11 and a WAVE communicator 12 as in FIG. 3. The in-provider control circuit 11, which is a control circuit in a provider side and connected with the WAVE communicator 12 to interconnect with each other, controls operations of the short-range service provision device 1 as a whole. The details of the in-provider control circuit 21 will be explained later.

The WAVE communicator 12, which includes an antenna for performing the WAVE communication, demodulates a signal received via the antenna and outputs it to the in-provider control circuit 11 while modulating a data inputted from the in-provider control circuit 11, converting to the radio wave to transmit. The transmission power of the radio wave from the antenna or the directionality of the antenna is adjusted to permit the maximum arrival distance of the radio wave transmitted from the antenna to be less than the above-mentioned area classification threshold value.

This WAVE communicator 12 is configured to be able to set a communication-target channel by selecting one channel through switching among the communication channel and the service channels. Operations of the WAVE communicator 12 is controlled by the in-provider control circuit 11. Note that the service channel designated as a communication-target channel from the plurality of service channels is indicated also from the in-provider control circuit 11.

The in-provider control circuit 11 is also referred to as an in-provider electronic control unit. The present embodiment configures, as an example, the in-provider control circuit 11 to be a computer to include a CPU 111, a RAM 112, a ROM 113, an I/O, and a bus line that connects the foregoing components. The RAM 112 is used as a computation region of the CPU 111, and functions also as a queue that stores a message for transmission which is generated by the message generator section F3 mentioned later. The region storing the message for transmission among the storage areas of the RAM 112 is referred to as a transmission queue, for convenience.

The ROM 113 stores a program (hereinafter, provision-device program) for making a usual computer function as the in-provider control circuit 11. Note that the above-mentioned provision-device program only needs to be stored in a non-transitory tangible storage media such as ROM. Executing the provision-device program by the CPU 111 corresponds to executing a method corresponding to the provision-device program.

Further, the ROM 113 stores the information such as the information for generating a WSA corresponding to the service which the short-range service provision device 1 provides, and the attribution information which indicates the attribute as a service provision device. This attribution information includes the information which indicates the magnitude of the communication area such as whether or not the communication area is specified to be a short range, the information which indicates whether it is a mobile service provision device, and the kind of a service provided.

Figure 4:
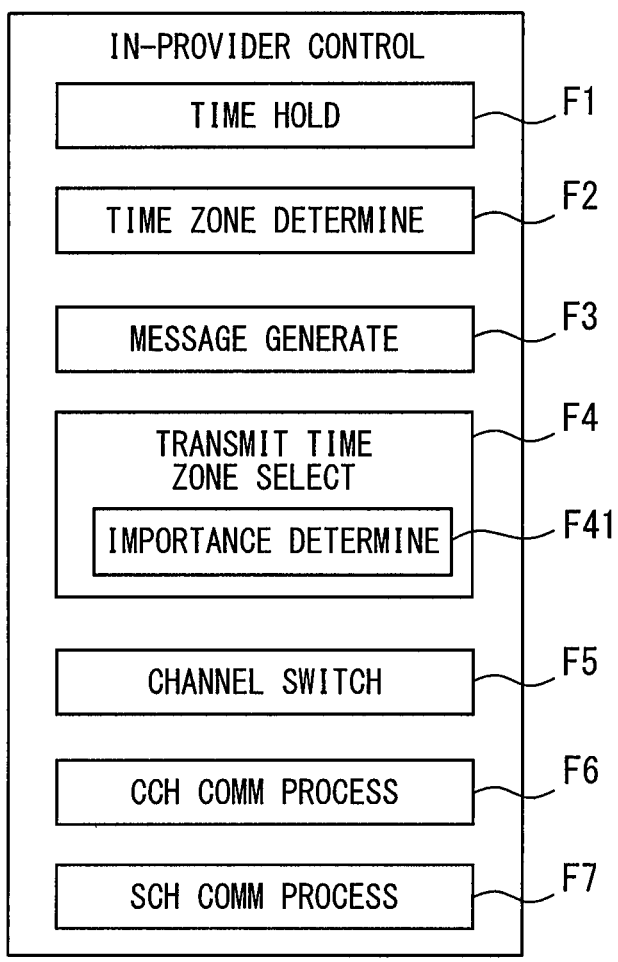
FIG. 4 is a block diagram illustrating an example of a schematic configuration of an in-provider control circuit.

The in-provider control circuit 11 includes, as in FIG. 4, a time holder section F1, a time zone determiner section F2, a message generator section F3, a transmission time zone selector section F4, a channel switch section F5, a CCH communication processor section F6, and an SCH communication processor section F7, (which are also referred to as a time holder F1, a time zone determiner F2, a message generator F3, a transmission time zone selector F4, a channel switch F5, a CCH communication processor F6, and an SCH communication processor F7), as functional blocks achieved by executing the above-mentioned provision-device program. In addition, the transmission time zone selector section F4 includes an importance determiner section F41 (which is also referred to as an importance determiner F41), as a finer functional block.

All or part of the functions provided by the in-provider control circuit 11 may be configured as hardware circuits such as one or more ICs. Hereinafter, the service provision device using the in-provider control circuit 11 is also referred to as a host device (host service provision device) for distinguishing from another service provision device.

The time holder section F1 holds the time information which indicates the clock time at present. The clock time held by the time holder section F1 is equivalent to a clock time serving as a predetermined reference (hereinafter, reference clock time) held primarily by each communication device which performs the WAVE communication.

For instance, a reference clock time is a clock time (hereinafter, GNSS clock time) used in global navigation satellite system (hereinafter, GNSS), but not limited thereto. The reference time may be a universal time, coordinated (UTC). Furthermore, it may be a clock time system uniquely defined in the mobile communication system 100. Communication devices performing the WAVE communications with each other only need to use common clock time information. Therefore, the clock time held by an in-provider control circuit 11 may be defined as a reference clock time in the vicinity of the corresponding short-range service provision device.

The time holder F1 may be configured to receive the information indicating a reference clock time from a server provided in an outside entity, for instance. As another example, when the short-range service provision device 1 is provided with a GNSS receiver used by GNSS, the time holder section F1 is configured to acquire a reference clock time from the GNSS receiver. This is because the GNSS receiver receives radio waves transmitted from the satellites (hereinafter, GNSS satellites) used in GNSS, and thereby acquires a GNSS clock time.

The time zone determiner section F2 identifies the switching point of time at which the communication time zones are switched based on the clock time information held in the time holder section F1, while determining whether the current communication time zone is the CCH time zone or the SCH time zone based on the clock time information held by the time holder section F1.

The message generator section F3 generates a data as a message transmitted using the control channel (hereinafter, a CCH message), and a data as a message transmitted using the service channel (hereinafter, an SCH message). The message generator section F3 is equivalent to the data generator section or the data generator.

The CCH message is a WSA about the service (i.e., short-range service) provided by the short-range service provision device 1, for example. A WSA is generated successively (e.g., each 100 milliseconds). The generation interval of a WSA may be determined depending on the cycle in which the communication time zone is switched to the CCH time zone.

In addition, the CCH message includes a message whose transmission destination is a different service provision device. The message whose transmission destination is a different service provision device functions as a message for service provision devices mutually cooperate with each other (hereinafter, a cooperation message) such as sharing the information between the service provision devices. The cooperation message is equivalent to the different-device-use data.

The SCH message is a message that includes the detailed information for providing services to the in-vehicle device 3

(hereinafter, service information message), for example. For example, suppose a short-range service provision device 1 provides a service that is a fee collection service. In such a case, the SCH message is generated to request a return of the information for the fee collection from the in-vehicle device 3. The information for the fee collection includes a user ID which is previously assigned to each user in order to identify the user. The SCH message may be generated successively depending on the cycle in which the communication time zone is switched to the SCH time zone. The various messages generated by the message generator section F3 are once stored in the transmission queue of the RAM 112.

The transmission time zone selector section F4 selects either the CCH time zone or the SCH time zone whichever is used for transmission based on the kind of the message generated by the message generation section F3. In other words, the transmission time zone selector section F4 determines which one of the CCH time zone and the SCH time zone is employed as a transmission time zone for transmission of a message.

When the message generated by the message generator section F3 is the SCH message, the transmission time zone selector section F4 designates the SCH time zone as the transmission time zone. In addition, when the message generated by the message generator section F3 is the CCH message, the importance determiner section F41 determines whether the generated CCH message has a high-importance level or a low-importance level based on the kind of the message.

When the importance determiner section F41 determines that the CCH message generated by the message generator section F3 has a high-importance level, the transmission time zone selector section F4 designates the CCH time zone as a transmission time zone for this CCH message. By contrast, when the importance determiner section F41 determines that the CCH message generated by the message generator section F3 has a low-importance level, the transmission time zone selector section F4 designates the SCH time zone as a transmission time zone for this CCH message.

The importance determiner section F41 determines whether the CCH message corresponds to the message with a high-importance level or the message with a low-importance level based on the kind of the CCH message.

Figure 5:
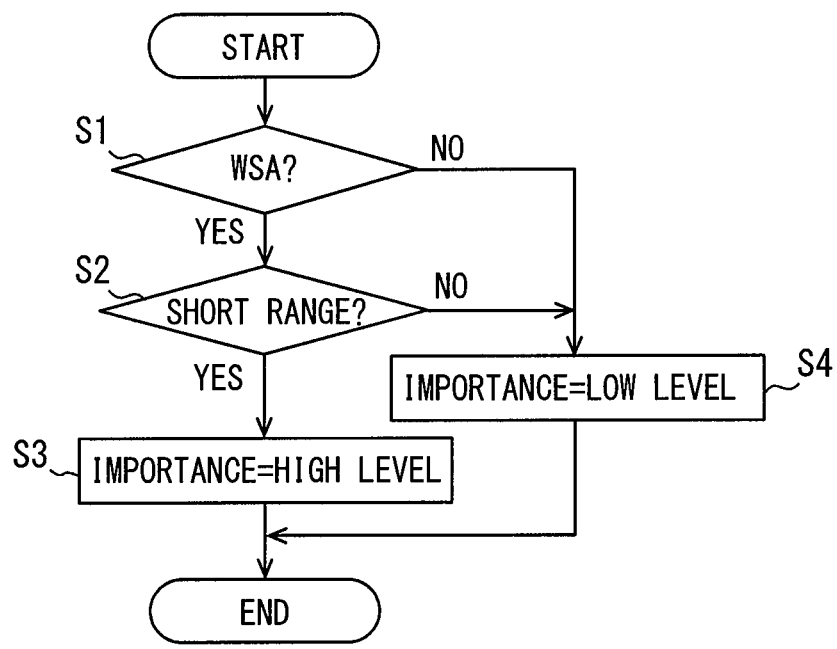
FIG. 5 is a flowchart for explaining an operation of an importance determiner section.

The determining procedure by this importance determiner section F41 will be explained using the flowchart in FIG. 5. Note that the flowchart in FIG. 5 may be started when the message generator section F3 generates a CCH message.

First, at S1, it is determined whether the CCH message generated by the message generator section F3 is a WSA. When the CCH message generated by the message generator section F3 is a message other than a WSA (for example, cooperation message), the determination at S1 is made negated, advancing the sequence to S4. Whether a message is a WSA or not may be identified by referring to a header of the message, for instance. The header contains the information indicates the kind of the message.

By contrast, when the CCH message generated by the message generator section F3 is a WSA, the determination at S1 is made affirmed, the sequence moves to S2, where it is determined whether the service corresponding to the WSA is a short range service. This determination at S2 is equivalent to the determination whether the communication area of the host device is specified as a short range. For example, the importance determiner section F41 may refer to the attribution information in the ROM 113, and determine whether the communication area of the host device is specified as a short range.

When the communication area of the host device is specified as a short range, the determination at S2 is made affirmed, advancing the sequence to S3. By contrast, when the communication area of the host device is specified as a wide range, the determination at S2 is made negated, advancing the sequence to S4. At S3, it is determined that an importance level of the message is a high-importance level. At S4, it is determined that an importance level of the message is a low-importance level.

The criterion for determining whether the importance level of the message is a high-importance level or is a low-importance level may be defined previously by a designer or an administrator of the mobile communication system 100. Alternatively, the importance determiner section F41 determines that the importance level is a high-importance level when the host device is a mobile service provision device and the generated CCH message is a WSA.

In addition, when the priority is previously assigned to each kind of service, this priority may be used for determining whether the importance level of the generated WSA is a high-importance level or a low-importance level. For example, the criterion may be defined such that the importance level of the WSA of a service of which the priority is equal to or greater than a predetermined threshold value may be determined to be a high-importance level, whereas the importance level of the WSA of the service of which the priority is less than the predetermined threshold value may be determined to be a low-importance level. That is, the WSA of the service having a priority equal to or greater than the threshold value may be defined as a data having a high-importance level.

The channel switch section F5, which may be referred to as a channel controller section, controls a communication-target channel of the WAVE communicator 12. For example, when switching the communication-target channel according to the transitions of the communication time zones, the channel switch section F5 switches the communication-target channel at the switching point of time. In addition, the channel switch section F5 may hold the state where a predetermined communication channel is designated as the communication-target channel, regardless of the transitions of the communication time zones. The communication-target channel control mode may be determined depending on the transmission time zone assigned by the transmission time zone selector section F4 to the message stored in the transmission queue, as explained below.

The CCH communication processor section F6 collaborates with the channel switch section F5, and transmits the CCH message stored in the transmission queue via the transmission time zone that is assigned to the CCH message.

For example, when the CCH message assigned with the CCH time zone as the transmission time zone is present in the transmission queue, the channel switch section F5 is caused to designate the control channel as the communication-target channel in the next CCH time zone to then transmit the CCH message.

In contrast, when the CCH message assigned with the SCH time zone as the transmission time zone is present in the transmission queue, the channel switch section F5 is caused to designate the control channel as the communication-target channel in the next SCH time zone to then transmit the CCH message. This CCH communication processor section F6 is equivalent to the CCH transmission processor section or the CCH transmission processor.

The SCH communication processor section F7 collaborates with the channel switch section F5, and transmits the SCH message stored in the transmission queue via the SCH time zone. It is because the SCH time zone is assigned to the SCH message as a transmission time zone.

<Relating to Operation of Short-Range Service Provision Device 1>

The following explains an operation of the short-range service provision device 1. The short-range service provision device 1 generates a WSA as a CCH message which should be transmitted in the CCH time zone successively (each 100 milliseconds, e.g.), and generates also an SCH message which should be transmitted in the SCH time zone successively.

Figure 6:
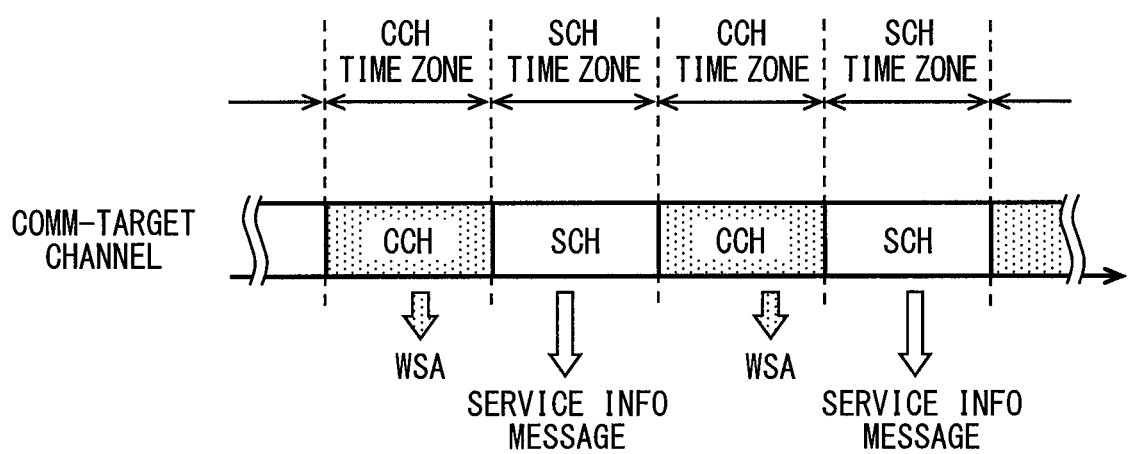
FIG. 6 is a diagram for explaining an operation of a short-range service provision device.

The channel switch section F5 of the short-range service provision device 1 thus switches the communication-target channels according to the transitions of the communication time zones, as in FIG. 6. In detail, the control channel is designated as the communication-target channel during a period of time for which the CCH time zone takes place; the service channel is designated as the communication-target channel during a period of time for which the SCH time zone takes place. As a result, the short-range service provision device 1 transmits a WSA during the CCH time zone and an SCH message during the SCH time zone, in order.

<Configuration and Operation of Wide-Range Service Provision Device 2>

The following explains a configuration of the wide-range service provision device 2. The wide-range service provision device 2 is a service provision device providing the communication area specified to be a wide range, as mentioned above. In the present embodiment, this wide-range service provision device 2 is a fixed service provision device that is a service provision device being a fixed type, as an example.

Figure 7:
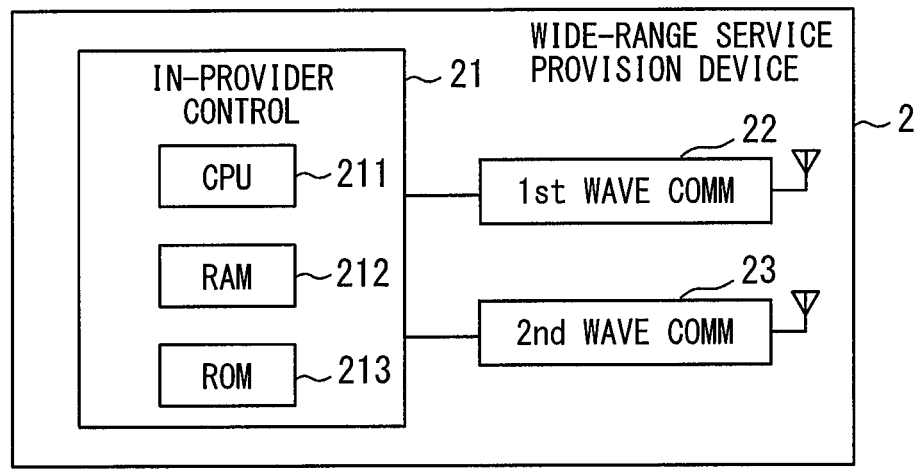
FIG. 7 is a block diagram illustrating an example of a schematic configuration of a wide-range service provision device.

This wide-range service provision device 2 includes an in-provider control circuit 21, a first WAVE communicator 22, and a second WAVE communicator 23, as in FIG. 7. The first WAVE communicator 22 and the second WAVE communicator 23 each are a component that has a function similar to that of the WAVE communicator 12 included in the short-range service provision device 1. The explanation about the first WAVE communicator 22 and the second WAVE communicator 23 is thus omitted. However, the transmission powers of the first WAVE communicator 22 and the second WAVE communicator 23 are adjusted to provide the communication area to be a wide range.

The in-provider control circuit 21 is also referred to as an in-provider electronic control unit. The present embodiment configures, as one example, the in-provider control circuit 21 to be a computer to include a CPU 211, a RAM 212, a ROM 213, an I/O, and a bus line that connects the foregoing components. The ROM 213 stores the above-mentioned the provision-device program, etc. The CPU 211 executes the provision-device program; thereby, the in-provider control circuit 21 functions like the in-provider control circuit 11 included in the short-range service provision device 1. That is, the in-provider control circuit 21 also includes a time holder section F1, a time zone determiner section F2, a message generator section F3, a transmission time zone selector section F4, a channel switch section F5, a CCH communication processor section F6, and an SCH communication processor section F7, as functional blocks.

The ROM 213 stores the information for generating a WSA corresponding to the service which the wide-range service provision device 2 provides, and the attribution information which indicates the attribute as a service provision device. That is, the ROM 213 stores the information indicating that the communication area being specified to be a wide range, the service provision device being a fixed type, and the kind of the provided service.

The following explains the differences between this wide-range service provision device 2 and the short-range service provision device 1 in order.

First, the communication area of the wide-range service provision device 2 is specified to be a wide range; thus, the transmission time zone of a WSA as a CCH message generated by the message generator section F3 is set to the SCH time zone. In contrast, the service information message serving as the SCH data is also generated as an SCH message. That is, both the CCH message and the SCH message are generated as a message which should be transmit during the SCH time zone.

Assume that the wide-range service provision device 2 includes only one component equivalent to the WAVE communicator 12 (hereinafter, WAVE communicator). Such an assumption poses an issue that allows only either the WSA or the service information message to be transmitted during one SCH time zone.

The reason why the wide-range service provision device 2 according to the present embodiment includes two WAVE communicators is to solve the above-mentioned issue. Providing two WAVE communicators permits both the transmission of a WSA being a CCH message and the transmission of a service information message being an SCH message.

Figure 8:
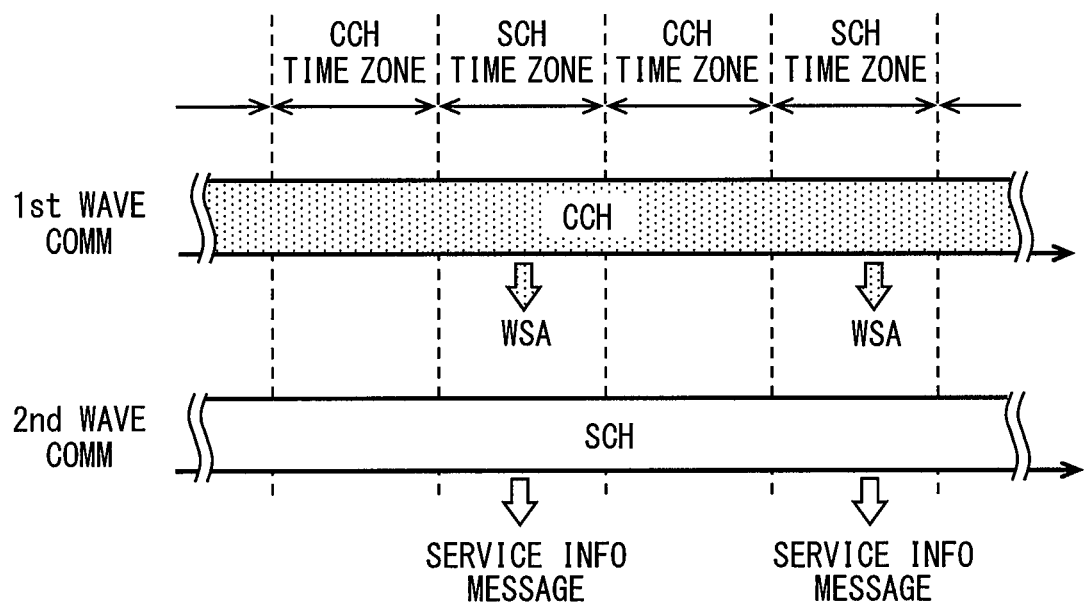
FIG. 8 is a diagram for explaining an operation of a wide-range service provision device.

For example, the channel switch section F5 of the wide-range service provision device 2 may operate each WAVE communicator as in FIG. 8 such that the communication-target channel of the first WAVE communicator 22 is fixed to the control channel while the communication-target channel of the second WAVE communicator 23 is fixed to the service channel. Such a control mode can perform both the transmission of the CCH message and the transmission of the SCH message during the same SCH time zone. Naturally, the reception of each communication channel can also be performed.

Figure 9:
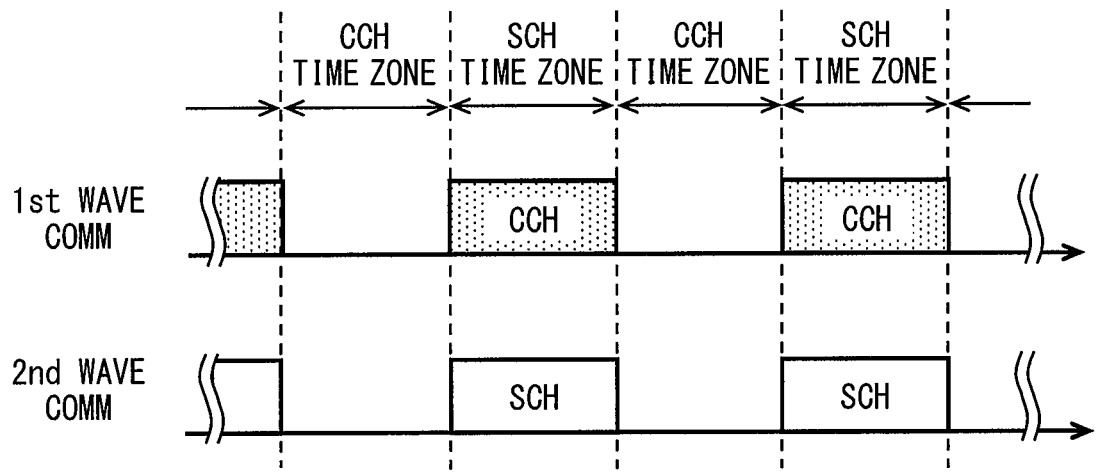
FIG. 9 is a diagram for explaining a modification example of an operation of a wide-range service provision device.

Operating the first WAVE communicator 22 and the second WAVE communicator 23 is not limited to the configuration in FIG. 8. For example, as in FIG. 9, each WAVE communicator may transition to the sleep mode during the CCH time zone. The sleep mode is the state where any communication is not executed. When it is in the sleep mode, the consumed electric power is reduced as compared with the state where the communication is executed.

Figure 10:
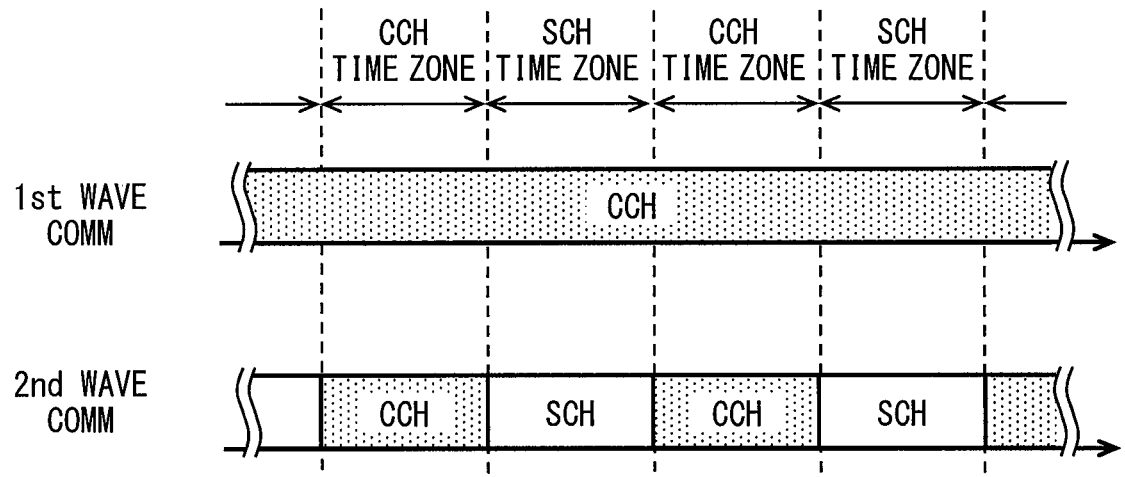
FIG. 10 is a diagram for explaining a modification example of an operation of a wide-range service provision device.

In addition, as in FIG. 10, the communication-target channel of the first WAVE communicator 22 is fixed to the control channel, whereas the communication-target channel of the second WAVE communicator 23 is switched between the control channel and the service channel depending on the transitions of the communication time zones.

<Configuration of in-Vehicle Device 3>

The following explains a configuration and an operation of the in-vehicle device 3. The vehicle using the in-vehicle device 3 corresponds to various types of vehicles running roads such as a passenger car, a bus, a truck. FIG. 1 illustrates a four-wheel vehicle; however, the vehicle may be two-wheel vehicle or three-wheel vehicle. The two-wheel vehicle may include a bicycle.

Although the present embodiment provides a configuration in which the in-vehicle device 3 is mounted in a vehicle, another configuration may be employed in which the in-vehicle device 3 is brought into a vehicle by a user. The mode of being mounted in a vehicle includes not only the mode of being assembled into a vehicle but also the configuration of being removably attached to a holder installed in a vehicle. Hereinafter, the vehicle where the in-vehicle device 3 is mounted is also referred to as a host vehicle.

Figure 11:
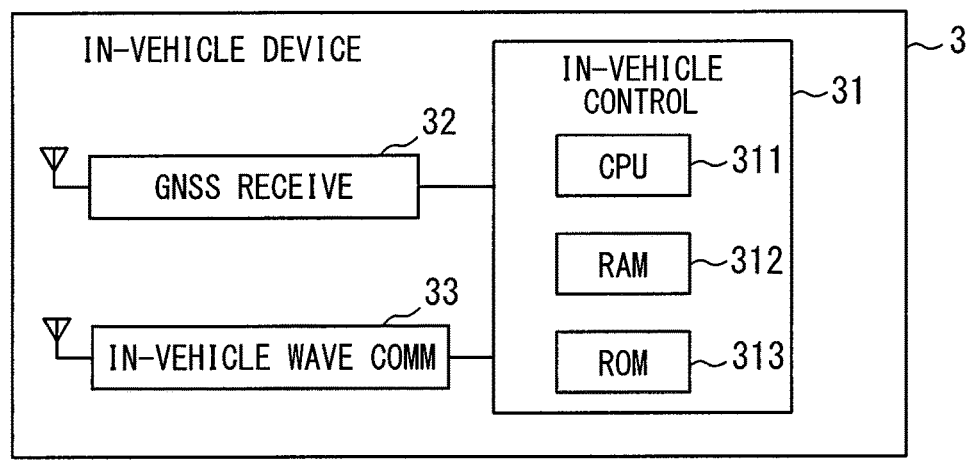
FIG. 11 is a block diagram illustrating an example of a schematic configuration of an in-vehicle device.

This in-vehicle device 3 includes the in-vehicle control circuit 31, the GNSS receiver 32, and the in-vehicle WAVE communicator 33, as illustrated in FIG. 11. The in-vehicle control circuit 31 is connected to communicate with each of the GNSS receiver 32 and the in-vehicle WAVE communicator 33, controlling overall operations of the in-vehicle device 3. The details of the in-vehicle control circuit 31 will be explained later.

The GNSS receiver 32 is a receiver to receive the radio waves from the above-mentioned GNSS satellites. The GNSS receiver 32 contains internally a clock (hereinafter, internal clock), and receives the radio waves from the GNSS satellites to thereby synchronize the internal clock with the GNSS clock time.

The in-vehicle WAVE communicator 33, which includes an antenna for performing WAVE communications, demodulates a signal received via the antenna and outputs it to the in-vehicle control circuit 31 while modulating a data inputted from the in-vehicle control circuit 31, converting to the radio waves to transmit. The transmission power of the radio wave in the in-vehicle WAVE communicator 33 may be designed as needed. For example, the electric power may be set to provide the maximum arrival distance of hundreds meters in a clear view.

This in-vehicle WAVE communicator 33 is configured to set a communication-target channel by selecting one channel from the control channel and the service channels. That is, both the communication using the control channel and the communication using the service channel are performed via the in-vehicle WAVE communicator 33.

Operations of the in-vehicle WAVE communicator 33 is controlled by the in-vehicle control circuit 31. Note that the service channel designated as a communication-target channel from the plurality of service channels is indicated also from the in-vehicle control circuit 31.

The in-vehicle control circuit 31 is configured to be a computer to include a CPU 311, a RAM 312, a ROM 313, an I/O, and a bus line that connects the foregoing components. The ROM 313 stores a program (vehicular program, hereinafter) that makes a usual computer function as the in-vehicle control circuit 31 in the present embodiment, and a service list indicating services provided by the in-vehicle device 3.

The above-mentioned vehicular program only needs to be stored in a non-transitory tangible storage media. Executing the vehicular program by the CPU 311 corresponds to executing a method corresponding to the vehicular program.

The in-vehicle control circuit 31 executes the above-mentioned vehicular program, thereby executes the various processes such as controlling a communication-target channel of the in-vehicle WAVE communicator 33. In detail, the in-vehicle control circuit 31 designates the control channel as the communication-target channel even in the SCH time zone under the state of not receiving a WSA corresponding to the service which the in-vehicle control circuit 31 should use.

When receiving a WSA corresponding to the service which the in-vehicle WAVE communicator 33 should use, the communication-target channel is set to a predetermined service channel based on the information indicated by the WSA to thereby use the service. Further, that the in-vehicle device 3 uses the service is equivalent to that the user of the in-vehicle device 3 enjoys the service.

In addition, when a plurality of WSA(s) are received in one CCH time zone, a service is selected from the services advertised by the WSA(s) according to a predetermined rule. The process for using the selected service is then executed. In detail, at the point of time at which the next SCH time zone starts to take place, the service channel corresponding to the selected service is designated as the communication-target channel, and the communication with the service provision device is performed using the service channel. Hereinafter, an event of the in-vehicle device 3 starting the communication with the service provision device using a predetermined service channel is also represented as opening a service channel.

The rule for selecting a service to be used from a plurality of services may be designed as needed. For example, when the priority is previously specified for each service, the service having the highest priority may be selected from the available services.

Effect of Embodiment

Figure 12:
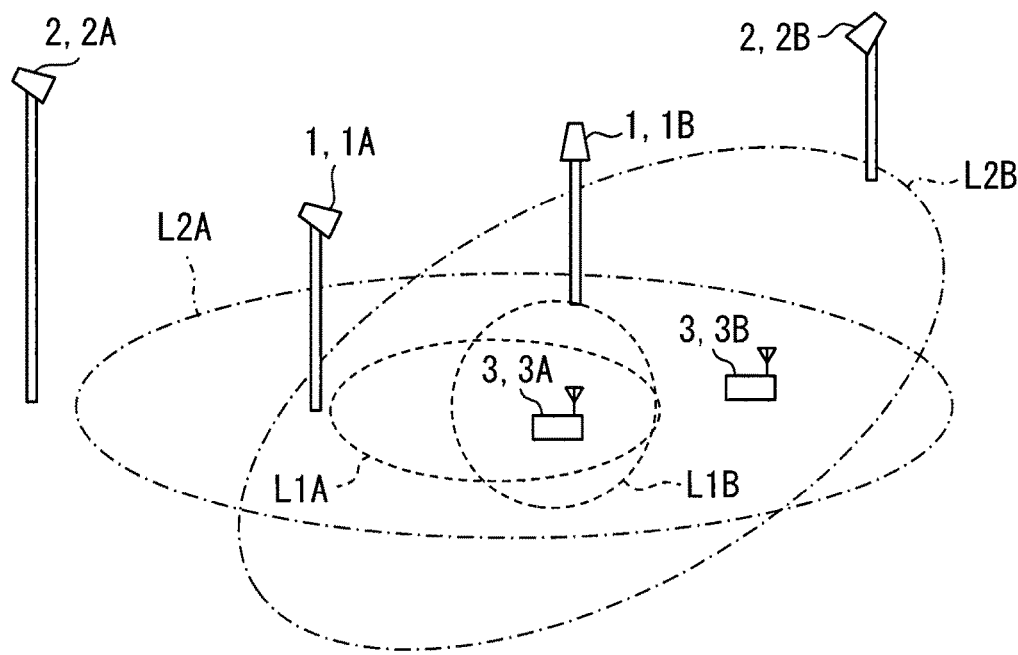
FIG. 12 is a diagram for explaining an effect according to the present embodiment.
Figure 13:
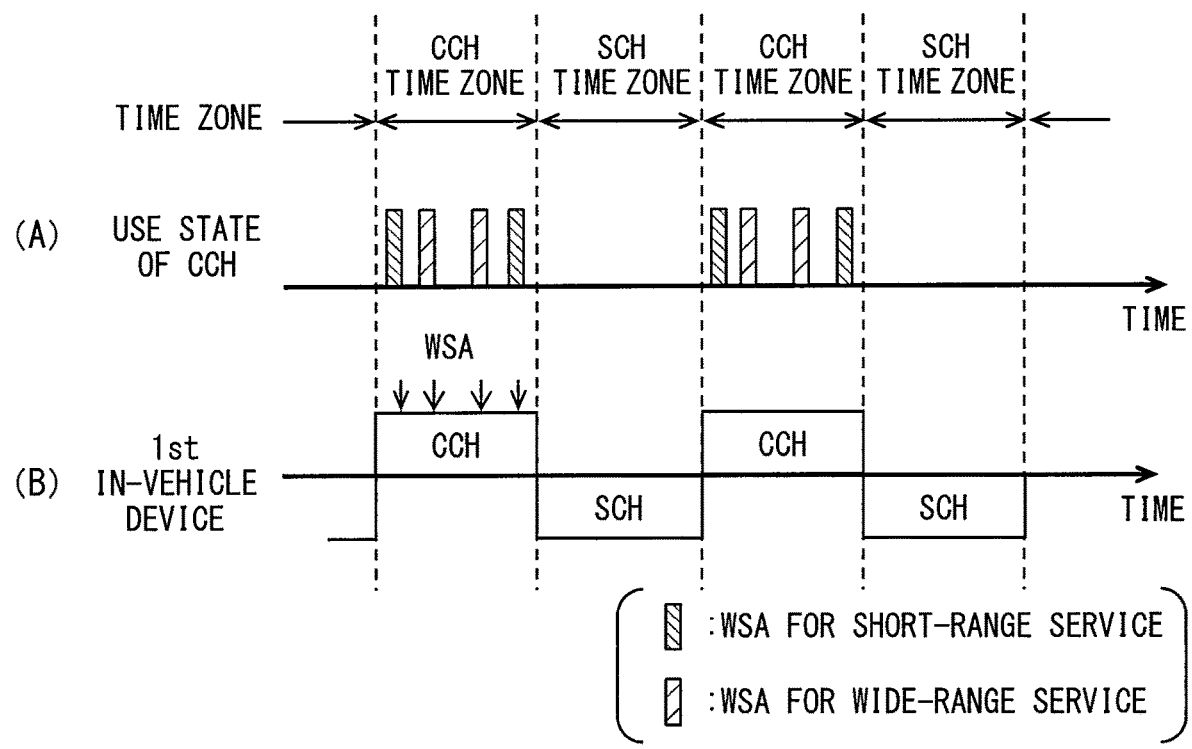
FIG. 13 is a diagram for explaining an operation of a comparative configuration.
Figure 14:
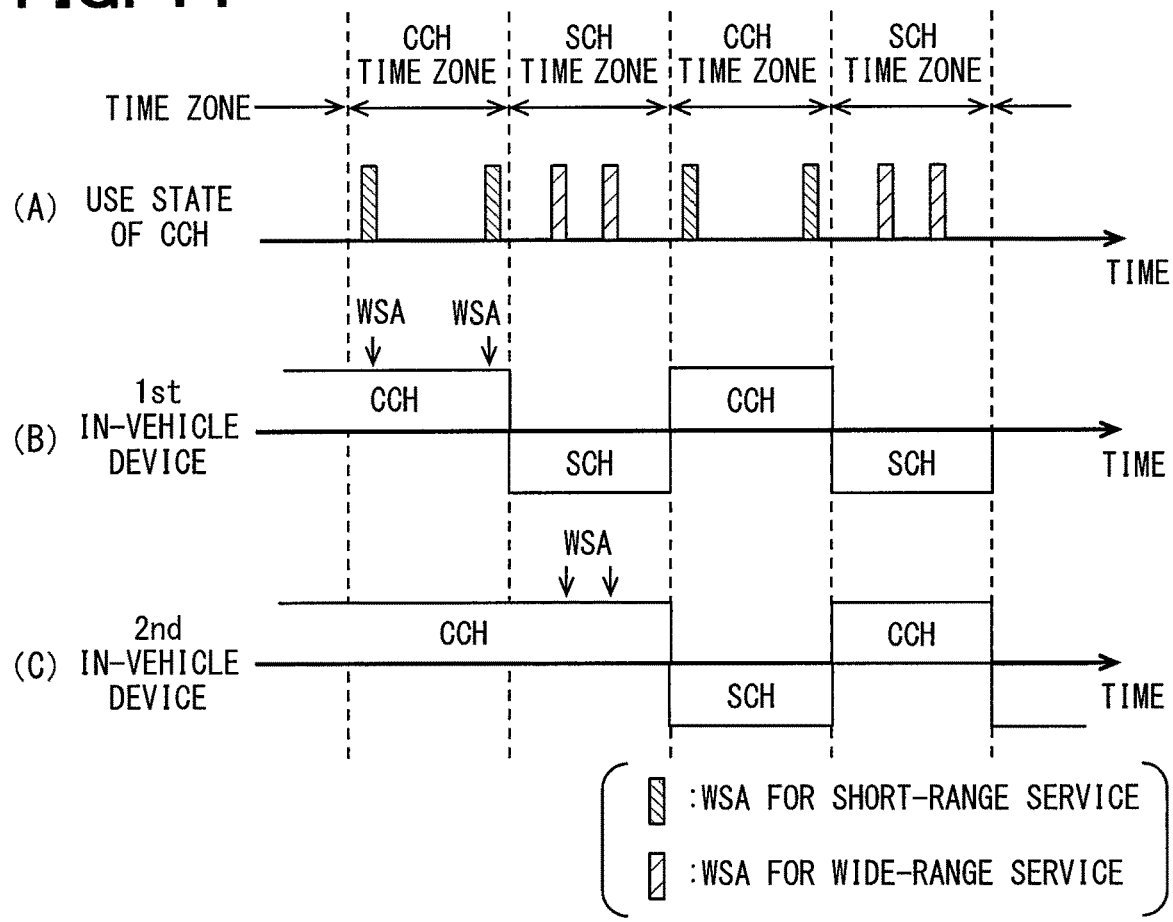
FIG. 14 is a diagram for explaining an operation of the present embodiment.

The following explains an operation and an effect of the above embodiment using FIG. 12, FIG. 13, and FIG. 14. In FIG. 12, the short-range service provision devices 1A and 1B are the short-range service provision devices 1 that provide mutually different services; the wide-range service provision devices 2A and 2B are the wide-range service provision devices 2 that provide mutually different services.

In FIG. 12, the area surrounded by the broken line L1A illustrates the communication area of the short-range service provision device 1A; the area surrounded by the broken line L1B illustrates the communication area of the short-range service provision device 1B. The area surrounded by the alternate long and short dash line L2A illustrates the communication area of the wide-range service provision device 2A; the area surrounded by the alternate long and short dash line L2B illustrates the communication area of the wide-range service provision device 2B. The short-range service provision devices 1A and 1B are present in the communication areas of the wide-range service provision devices 2A and 2B, while the wide-range service provision devices 2A and 2B are present outside of the communication areas of the short-range service provision devices 1A and 1B.

In addition, the in-vehicle device 3A is present in a region where the communication areas of the short-range service provision devices 1A and 1B and the communication areas of the wide-range service provision devices 2A and 2B are overlapped with each other; the in-vehicle device 3B is present in a region where the respective communication areas of the wide-range service provision device 2A and 2B are overlapped with each other. For convenience, the in-vehicle device 3A is indicated as a first in-vehicle device 3A; the in-vehicle device 3B is indicated as a second in-vehicle device 3B.

An effect of the present embodiment in such a situation will be explained by employing a comparative configuration. This comparative configuration has a configuration in which each service provision device does not include a transmission time zone selector section F4, whereas the CCH communication processor sections of the respective service provision devices transmit CCH messages for WSA(s) etc., during the CCH time zone, without variation.

When the service provision device has the comparative configuration, each service provision device transmits any WSA during the CCH time zone, as indicated in (A) of FIG. 13. That is, four WSA(s) are transmitted in order during one CCH time zone.

That is, when a service provision device transmits a CCH message of a WSA etc. in the comparative configuration, one communication channel (i.e., control channel) is shared in the same communication time zone by another service provision device. This increases a possibility that CCH messages transmitted by a plurality of service provision devices collide with each other as the number of service provision devices whose communication areas catch the first in-vehicle device 3A increases.

Note that the short-range service provision devices 1A and 1B are able to receive WSA(s) distributed by the wide-range service provision device 2A and 2B. Supposing that a service provision device has a configuration executing a well-known carrier sensing process. Such a case can reduce a possibility that the short-range service provision devices 1A and 1B transmit WSA(s) while the wide-range service provision device 2A and 2B transmit WSA(s).

However, the wide-range service provision devices 2A and 2B are present outside of the communication areas of the short-range service provision devices 1A and 1B; thus, the wide-range service provision devices 2A and 2B cannot recognize whether the short-range service provision devices 1A and 1B transmit WSA(s). This increases a possibility that the wide-range service provision device 2A and 2B transmit WSA(s) when the short-range service provision devices 1A and 1B transmit WSA(s). If the WSA transmitted by the short-range service provision device 1 collides with the WSA transmitted by the wide-range service provision device 2, both of the WSA(s) cannot be received by the first in-vehicle device 3A.

In addition, in the comparative configuration, the first in-vehicle device 3A receives four WSA(s) in order within one CCH time zone, as indicated in (B) of FIG. 13. Such a state requires the in-vehicle device 3 to recognize that the four services are available based on the WSA(s) received successively, and select a used service from the four services.

By contrast, according to the present embodiment, as illustrated in (A) of FIG. 14, the short-range service provision devices 1A and 1B transmit WSA(s) during the CCH time zone, whereas the wide-range service provision device 2A and 2B transmit WSA(s) during the SCH time zone. This can decrease the number of communication devices that use the control channel as carrier during the CCH time zone relatively easily as compared with the comparative configuration.

As the number of communication devices that use the control channel decreases, a possibility of the packet collision arising is also suppressed. That is, the configuration of the present embodiment can suppress an issue of the in-vehicle device 3 failing to receive a WSA transmitted by a service provision device due to the collision between the WSA and another WSA transmitted by another service provision device.

Further, in the present embodiment, the communication time zone during which the short-range service provision device 1 transmits a WSA is different from the communication time zone during which the wide-range service provision device 2 transmits a WSA. As in (B) of FIG. 14, the number of WSA(s) which the first in-vehicle device 3A receives during one communication time zone is thus reduced as compared with the comparative configuration. This can reduce the load in the process which the first in-vehicle device 3A performs during the CCH time zone.

When the first in-vehicle device 3A enters the communication area (hereinafter, short-range service provision area) of the short-range service provision devices 1A and 1B, the communication-target channel in the SCH time zone is set to a predetermined service channel based on the WSA received in the CCH time zone. This disables the reception of WSA(s) transmitted by the wide-range service provision device 2A and 2B in the SCH time zone. That is, the in-vehicle device 3A may be unable to receive WSA(s) transmitted from the wide-range service provision device 2A and 2B within the short-range service provision area.

By contrast, the communication area of the wide-range service provision device 2A and 2B is a wide range. Therefore, before reaching the short-range service provision area, the first in-vehicle device 3A is expected to receive WSA(s) transmitted by the wide-range service provision devices 2A and 2B and to then transition to a state of using the wide-range service.

Suppose that the first in-vehicle device 3A is present at the position of the second in-vehicle device 3B. Such a case allows the reception of WSA(s) transmitted by the wide-range service provision devices 2A and 2B, as in (C) of FIG. 14. Therefore, before reaching the communication areas of the short-range service provision devices 1A and 1B, the first in-vehicle device 3A and the second in-vehicle device 3B are expected to be using those services.

Naturally, the first in-vehicle device 3A and the second in-vehicle device 3B need not receive a WSA of a used service again. Assume that the in-vehicle device 3A already uses the services of the wide-range service provision devices 2A and 2B. Such a case does not involve any disadvantage in the in-vehicle device 3A being unable to receive, in the short-range service provision area, WSA(s) transmitted from the wide-range service provision device 2A and 2B.

In addition, assume that the in-vehicle device 3 reaches a short-range service provision area before using the services provided by the wide-range service provision device 2A and 2B. Such a case provides a possibility that allows the reception of the WSA provided by the wide-range service provision device 2A and 2B after exiting from the short-range service provision area. Even when the in-vehicle device 3 reaches a short-range service provision area before using the services provided by the wide-range service provision devices 2A and 2B, there is a relatively low possibility of the in-vehicle device 3 failing to use the services provided by the wide-range service provision devices 2A and 2B. That is, the wide-range service provision device 2 designating the SCH time zone as the communication time zone for transmitting a WSA does not pose a significant disadvantage.

Note that, as explained above, the criterion for determining whether the importance level of the message is a high-importance level or a low-importance level may be defined previously by a designer or an administrator of the mobile communication system 100.

For instance, suppose a configuration in which a WSA of the service provided by a mobile service provision device is determined to have a high-importance level. Such a case can increase a possibility that allows the service provided by the mobile service provision device to be used by an in-vehicle device 3. The reason is as follows.

First, the mobile service provision device and the in-vehicle device 3 each are a mobile object, which may produce a positional relation of oncoming vehicles facing each other. When the mobile service provision device and the in-vehicle device 3 have the relation of the oncoming vehicles, the duration time during which the in-vehicle device 3 can continue performing the WAVE communication with the mobile service provision device is shorter than the case where the service provision device is a fixed type.

This leads to a configuration in which the importance determiner section F41 determines that the WSA of the service provided by the mobile service provision device corresponds to the data with a high-importance level. This configuration can allow the service provision device to transmit a CCH message that should be received preferentially by the in-vehicle device 3 during the CCH time zone that is a communication time zone primarily used for transmission. The in-vehicle device 3 can thus reduce a possibility of the in-vehicle device 3 failing to receive a WSA of the service provided by the mobile service provision device.

Allowing the importance determiner section F41 to determine that the WSA of the service provided by the mobile service provision device corresponds to the data with a high-importance level is equivalent to defining a WSA of the service provided by the mobile service provision device as being a data having a high-importance level.

In addition, suppose a configuration in which the importance determiner section F41 determines whether a generated WSA has a high-importance level by using the priority previously specified for each kind of service. Such a configuration allows the service provision device to transmit a WSA of the service with a relatively high priority during the CCH time zone while transmitting a WSA of the service with a relatively low priority during the SCH time zone.

Such a configuration can reduce a possibility that the transmission of a WSA of the service with a relatively low priority during the CCH time zone poses the failure of transmitting a WSA of the service with a high priority or the failure of receiving the WSA due to the collision of packets. The case where the transmission of a WSA of the service with a low priority during the CCH time zone prevents a WSA of the service with a high priority from being transmitted is equivalent to the state where the carriers are crowded due to the co-existence of many service provision devices each providing a service with a low priority.

The message assigned with a high-importance level signifies a message that needs to be received by the in-vehicle device 3 with a relatively high necessity. In detail, the message assigned with a high-importance level is equivalent to a message which also needs to be received by even the in-vehicle device 3 that opens a service channel. Further, the message assigned with a low-importance level is equivalent to a message which does not need to be received by the in-vehicle device 3 that opens a service channel.

The reason why the importance level is determined to be high when the communication area is a short range in the above-mentioned embodiment is as follows. That is, this is because the period of time for which the in-vehicle device 3 can receive the message in the short-range communication area is relatively shorter than that in the wide-range communication area. In other words, the magnitude of the communication area being a short range may be preferably specified so as to allow even the in-vehicle device 3 opening a service channel to receive.

In addition, a cooperation message corresponds to a message that the in-vehicle device 3 does not need to receive. If a CCH message which such an in-vehicle device 3 need not receive is transmitted during the SCH time zone, a congestion of the control channel in the CCH time zone can be reduced.

The present embodiment exemplifies, as a CCH message other than a WSA, a cooperation message, but not limited to. For example, when a message for examining whether a service provision device operates normally is transmitted via the control channel, such an examination message corresponds to a CCH message.

First Modification Example

Figure 15:
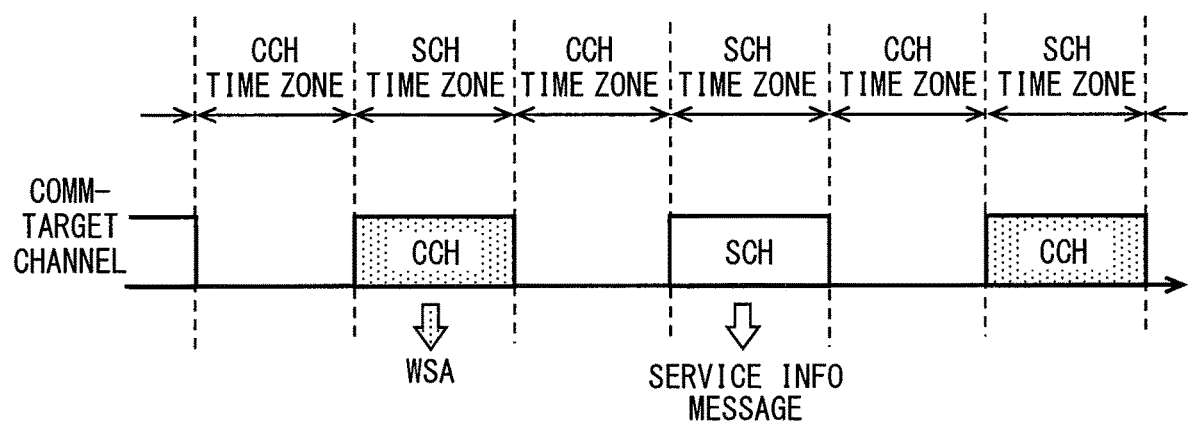
FIG. 15 is a diagram for explaining a modification example of a wide-range service provision device.

The present embodiment exemplifies a configuration where two wide-range service provision devices 2 includes two WAVE communicators, but not limited to. The wide-range service provision device 2 may include one WAVE communicator. In such a case, as in FIG. 15, a communication-target channel in the SCH time zone may be set alternately to the control channel and the service channel used to provide a service.

Second Modification Example

In addition, the above embodiment exemplifies a configuration in which the short-range service provision device 1 includes only one WAVE communicator 1 and is unable to use a plurality of communication channels at the same time, but not limited to. When providing a plurality of kinds of services, the service provision device 1 may include a plurality of WAVE communicators for the plurality of kinds of services. For example, when providing two kinds of services, the short-range service provision device 1 may include two WAVE communicators.

Similarly, when providing a plurality of wide-range services, the wide-range service provision device 2 may be configured to include a WAVE communicator operated with the control channel designated, and a plurality of WAVE communicators for transmitting respective service information messages of the wide-range services.

Third Modification Example

Furthermore, another configuration may be provided where a single service provision device performs both a short-range service and a wide-range service. Such a service provision device is referred to as a multi-service provision device. This multi-service provision device may be configured to include a WAVE communicator for performing a short-range service, a WAVE communicator for transmitting a WSA of a wide-range service, and a WAVE communicator for transmitting a service information message of the wide-range service.

Fourth Modification Example

The above exemplifies a configuration where a communication area of a service provision device is classified into two kinds of a short range and a wide range using a single kind of area classification threshold value, and the service provision device is classified into two kinds of a short-range service provision device 1 and a wide-range service provision device depending on the classified communication area, but not limited to.

For example, a communication area of a service provision device may be classified into three kinds of a short range, an intermediate range, and a wide range depending on the magnitude of the communication area. Suppose that the maximum arrival distance of the radio wave transmitted by a service provision device is less than a predetermined short-range classification threshold value defining a communication area serving as a short range. In such a case, the communication area of the service provision device is classified as a short range.

In contrast, suppose that the maximum arrival distance of the radio wave transmitted by a service provision device is greater than a predetermined wide-range classification threshold value defining a communication area serving as a wide range. In such a case, the communication area of the service provision device is classified as a wide range. Further, suppose that the maximum arrival distance of the radio wave transmitted by a service provision device is greater than a predetermined short-range classification threshold value and less than a predetermined wide-range classification threshold value. In such a case, the communication area of the service provision device is classified as an intermediate range.

The short-range classification threshold value or the wide-range classification threshold value may be designed suitably. For example, the short-range classification threshold values may be tens of meters such as 20 meters. In addition, the wide-range classification threshold value may be a relatively long distance such as 400 meters.

Naturally, the number of classifications of the communication area may be not only three but also more than three. Even under such a configuration, when the service provision area is less than a constant reference, a generated CCH message may be determined to have a high-importance level.

Fifth Modification Example

The above exemplifies a configuration where the criterion of determination whether the importance of a CCH message is a high-importance level or a low-importance level employs whether or not the communication area of the service provision device is a short range, but not limited to. The criterion of determination whether the importance of a CCH message is a high-importance level or a low-importance level does not necessarily employ the magnitude of the communication area. For instance, whether the importance of a CCH message is a high-importance level or a low-importance level may be determined based on whether a service provision device is mobile or not, or based on whether the priority of a provided service is greater than a predetermined threshold value.

Sixth Modification Example

The above exemplifies a configuration where among CCH messages, a message other than the WSA is determined to be a data having a low-importance level, but not limited to. For instance, a service provision device may be configured to be an emergency vehicle approach message that is a message announcing an approach of an emergency vehicle such as a police vehicle, a fire fighting vehicle, or ambulance vehicle. Such an emergency vehicle approach message having a high emergency level needs to be received by the in-vehicle device 3 even opening a service channel and thus is set as a high-importance level.

Seventh Modification Example

The above exemplifies a configuration where a service provision device that is a device providing a service to an in-vehicle device 3 functions as a communication device; however, the communication device is not limited to the service provision device. The communication device may not be a device providing a service to an in-vehicle device 3 by performing the communication with the in-vehicle device 3 via a service channel. A communication device only needs to generate a CCH message and transmit the CCH message in a communication zone based on the result of the determination by the importance determiner section F41.

For instance, a plurality of traffic lights may be provided in a single intersection. The traffic lights may be configured to adjust the switching point of time at which the respective displays are switched via the communication using a control channel. The communication device according to the embodiment may be applied to the traffic lights. The CCH messages exchanged between the traffic lights are equivalent to cooperation messages. That is, those CCH messages, which are the information that does not need to be received by an in-vehicle device 3, may thus be set as a low-importance level.

Eighth Modification Example

The above exemplifies an in-vehicle device 3 mounted in a vehicle as a communication device that uses a service provided by a service provision device by performing the WAVE communication with the service provision device; however, the communication device for using services is not limited to the in-vehicle device 3. Another configuration may be provided where a portable terminal that is a communication device carried by a pedestrian uses a service provided by a service provision device by performing the WAVE communication with the service provision device.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A communication device in a mobile communication system switching alternately two communication time zones of a control channel (CCH) time zone and a service channel (SCH) time zone, the CCH time zone being a time zone in which communication using a control channel assigned with a first predetermined radio-wave frequency is performed, the SCH time zone being a time zone different from the CCH, the SCH time zone in which communication using a service channel assigned with a second predetermined radio-wave frequency different from the first predetermined radio-wave frequency is performed,
   the communication device being provided along a road to perform wireless communication using the control channel and the service channel with an in-mobile device that is a device used in a mobile object, to provide a predetermined service to a user of the in-mobile device,
   the communication device comprising:
   a time holder section configured to hold clock time information used to determine a communication time zone at present;
   a time zone determiner section configured to determine whether the communication time zone at present corresponds to the CCH time zone or the SCH time zone, based on the clock time information held by the time holder section;
   a CCH transmission processor section configured to transmit data using the control channel;
   an SCH transmission processor section configured to transmit data using the service channel;
   a data generator section configured
   (i) to generate, as a data that is to be transmitted using the control channel, a service advertisement message that advertises a kind of the predetermined service provided by the communication device to the in-mobile device, so as to start communication using the SCH channel to provide the predetermined service, and (ii) to generate, as a data that is to be transmitted using the service channel, a service information message corresponding to the service advertisement message to provide the predetermined service;

a storage in which information on magnitude of a service provision area of the communication device is registered, the service provision area being an area where the predetermined service is provided; and an importance determiner section configured to determine an importance of the service advertisement message based on the magnitude of the service provision area registered in the storage when the data generated by the data generator section corresponds to the service advertisement message, wherein when determining that the magnitude of the service provision area registered in the storage is smaller than a predetermined reference, the importance determiner section determines that the service advertisement message has a high-importance level, whereas when determining that the magnitude of the service provision area registered in the storage is not smaller than the predetermined reference, the importance determiner section determines that the service advertisement message has a low-importance level;

wherein the service advertisement message that is determined to have the high-importance level is transmitted by the CCH transmission processor section in the CCH time zone using the control channel, the service advertisement message that is determined to have the low-importance level is transmitted by the CCH transmission processor section in the SCH time zone using the control channel, and the service information message is transmitted by the SCH transmission processor section in the SCH time zone using the service channel.

2. The communication device according to claim 1, wherein:

the data generator section generates a different-device-use data that is a data whose transmission destination is a different communication device that is different from and separated from the communication device provided along the road, the different communication device being provided along a road, the different communication device having an identical function of the communication device; and the importance determiner section determines that the different-device-use data is a data having a low-importance level.

3. The communication device according to claim 1, wherein each of (i) the service information message corresponding to the service advertisement message that is determined to have the high-importance level and (ii) the service information message corresponding to the service advertisement message that is determined to have the low-importance level is transmitted by the SCH transmission processor section in the SCH time zone using the service channel.

4. A communication device in a mobile communication system switching alternately two communication time zones of a control channel (CCH) time zone and a service channel (SCH) time zone, the CCH time zone being a time zone in which communication using a control channel assigned with a first predetermined radio-wave frequency is performed, the SCH time zone being a time zone different from the CCH, the SCH time zone in which communication using a service channel assigned with a second predetermined radio-wave frequency different from the first predetermined radio-wave frequency is performed, the communication device being provided along a road to perform wireless communication using the control channel and the service channel with an in-mobile device that is a device used in a mobile object, to provide a predetermined service to a user of the in-mobile device, the communication device comprising:

a storage in which information on magnitude of a service provision area of the communication device is registered, the service provision area being an area where the predetermined service is provided; and a control circuit, the control circuit being configured to function as:

a time holder section configured to hold clock time information used to determine a communication time zone at present;

a time zone determiner section configured to determine whether the communication time zone at present corresponds to the CCH time zone or the SCH time zone, based on the clock time information held by the time holder section;

a CCH transmission processor section configured to transmit data using the control channel;

an SCH transmission processor section configured to transmit data using the service channel;

a data generator section configured to (i) generate, as a data that is to be transmitted using the control channel, a service advertisement message that advertises a kind of the predetermined service provided by the communication device to the in-mobile device, so as to start communication using the SCH channel to provide the predetermined service, and (ii) generate, as a data that is to be transmitted using the service channel, a service information message corresponding to the service advertisement message to provide the predetermined service;

a storage in which information on magnitude of a service provision area of the communication device is registered, the service provision area being an area where the predetermined service is provided; and an importance determiner section configured to determine an importance of the service advertisement message based on the magnitude of the service provision area registered in the storage when the data generated by the data generator section corresponds to the service advertisement message, wherein when determining that the magnitude of the service provision area registered in the storage is smaller than a predetermined reference, the importance determiner section determines that the service advertisement message has a high-importance level, whereas when determining that the magnitude of the service provision area registered in the storage is not smaller than the predetermined reference, the importance determiner section determines that the service advertisement message has a low-importance level, wherein:

the service advertisement message that is determined to have the high-importance level is transmitted by the CCH transmission processor section in the CCH time zone using the control channel, whereas the service advertisement message that is determined to have the low-importance level is transmitted by the CCH transmission processor section in the SCH time zone using the control channel; and the service information message is transmitted by the SCH transmission processor section in the SCH time zone using the service channel.

5. The communication device according to claim 4, wherein:

the data generator section generates a different-device-use data that is a data whose transmission destination is a different communication device that is different from and separated from the communication device provided along the road, the different communication device being provided along a road, the different communication device having an identical function of the communication device; and the importance determiner section determines that the different-device-use data is a data having a low-importance level.

6. The communication device according to claim 4, wherein each of (i) the service information message corresponding to the service advertisement message that is determined to have the high-importance level and (ii) the service information message corresponding to the service advertisement message that is determined to have the low-importance level is transmitted by the SCH transmission processor section in the SCH time zone using the service channel.

7. The communication device according to claim 4, wherein the control circuit is configured by including (i) a hardware circuitry, or (ii) a central processing unit along with a memory storing instructions executed by the central processing unit, or (iii) both the hardware circuitry and the central processing unit along with the memory storing the instructions executed by the central processing unit.

* * * * *